(12) United States Patent
Sleator

(10) Patent No.: US 9,472,201 B1
(45) Date of Patent: Oct. 18, 2016

(54) SPEAKER LOCALIZATION BY MEANS OF TACTILE INPUT

(71) Applicant: Google Inc., Mountain View, CA (US)

(72) Inventor: Michael Sleator, Woodside, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/899,832

(22) Filed: May 22, 2013

(51) Int. Cl.
*G10L 21/00* (2013.01)

(52) U.S. Cl.
CPC ..................................... *G10L 21/00* (2013.01)

(58) Field of Classification Search
CPC combination set(s) only.
See application file for complete search history.

(56) References Cited

U.S. PATENT DOCUMENTS

| | | | |
|---|---|---|---|
| 7,995,779 B2 | 8/2011 | Petersen | |
| 9,232,310 B2 * | 1/2016 | Huttunen | H04R 5/027 |
| 9,338,549 B2 * | 5/2016 | Haulick | G01S 7/52003 |
| 2009/0002476 A1 | 1/2009 | Cutler | |
| 2011/0010171 A1 * | 1/2011 | Talwar et al. | 704/233 |
| 2011/0071825 A1 * | 3/2011 | Emori et al. | 704/233 |
| 2011/0285854 A1 * | 11/2011 | LaDuke et al. | 348/169 |
| 2012/0140955 A1 | 6/2012 | Yasui | |
| 2012/0163625 A1 * | 6/2012 | Siotis | H04R 3/005 381/92 |
| 2014/0337016 A1 * | 11/2014 | Herbig et al. | 704/201 |

FOREIGN PATENT DOCUMENTS

| | | | | |
|---|---|---|---|---|
| NO | WO2010088952 | * | 8/2010 | H04R 27/00 |
| WO | 2010/088952 | | 8/2010 | |
| WO | WO2013059728 | * | 4/2013 | G10L 21/02 |

* cited by examiner

*Primary Examiner* — Barbara Reinier
(74) *Attorney, Agent, or Firm* — Morris & Kamlay LLP

(57) ABSTRACT

A system can receive a gesture from a user and configure a microphone system based on the received gesture to be more sensitive in the direction of a user from a device. The gesture can detected by a sensor and can be a touch input, input from a camera and a depth sensor and the like. The microphone system can include a microphone that can be electronically or mechanically steerable, or both. Acoustic signals received from the direction of the user and from other directions can be used in conjunction with an automatic speech recognition system to detect and process a command from the user.

20 Claims, 3 Drawing Sheets

SPEAKER LOCALIZATION BY MEANS OF TACTILE INPUT

BACKGROUND

A device with one or more microphones can enable a speaker (such as a person) to interact with and control part or all of an electronic system, such as one or more appliances on a home automation network. Spoken commands can be detected and processed by an automatic speech recognition system. The accuracy with which a automatic speech recognition system can detect commands can depend on the signal-to-noise ratio of the signal received through the microphone system. A higher signal-to-noise can result in more accurate command detection.

BRIEF SUMMARY

An implementation of the disclosed subject matter can receive a gesture from a user and configure a microphone system based on the received gesture. The gesture can be a touch input, input from a camera and a depth sensor and the like. The microphone system can be configured to be more sensitive in the direction of the user from a device. The microphone may be electronically or mechanically steerable, or both. An implementation can receive a first acoustic input from the direction of the user. The first acoustic input can include a user command.

A second acoustic input can be received from a direction other than the direction of the user. The second acoustic input can be used to improve the signal-to-noise ratio of the first acoustic input. Automatic speech recognition can be performed based on the first acoustic input and the second acoustic input. A user command can be identified based on the results of the automatic speech recognition.

The gesture can be received by a sensor. An audio processor in communication with the sensor and the microphone system can configure the microphone system, receive the acoustic input and perform automatic speech recognition based on the acoustic input.

Additional features, advantages, and implementations of the disclosed subject matter may be set forth or apparent from consideration of the following detailed description, drawings, and claims. Moreover, it is to be understood that both the foregoing summary and the following detailed description are include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
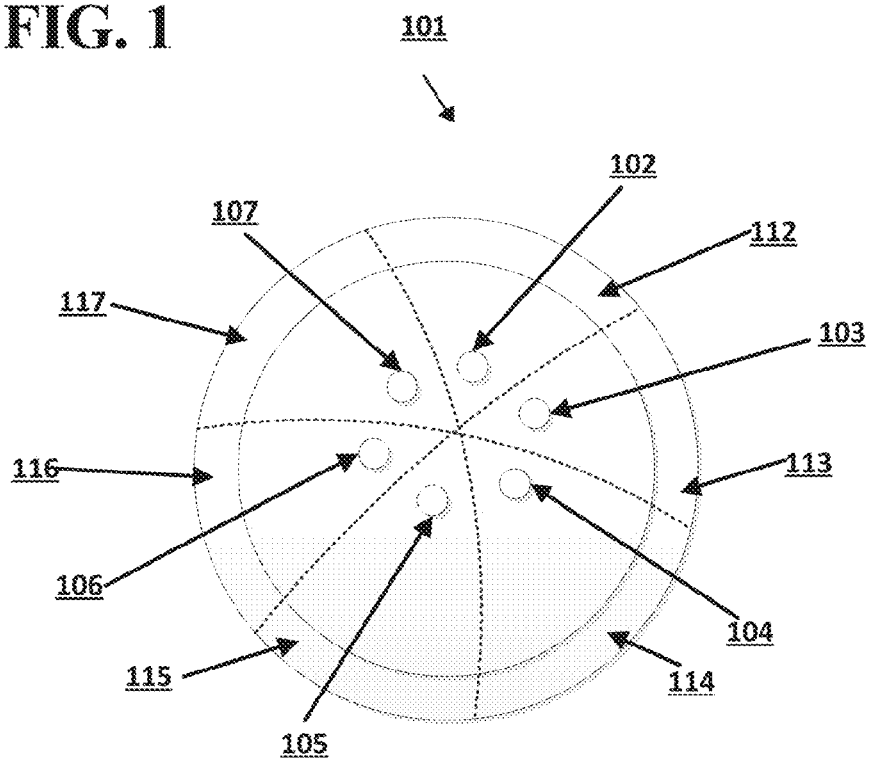
FIG. 1 shows a device according to an implementation of the disclosed subject matter.

An implementation of the disclosed subject matter can include a device having multiple microphone inputs. The device can determine which of the one or more microphones are best able to receive a voice input or other input from a user, such as a command, based on a gesture by a user. For example, the user can touch the device near one ore more microphones that are nearest to the user. The device can recognize the one or more microphones indicated by the user gesture as the source of user input, such as a command to a home automation system. The one or more such microphones can be "selected" microphones. The device can use at least some of the sounds detected through at least some of the other, "non-selected" microphones to cancel ambient noise in the input from the selected one or more microphones. This can improve the signal-to-noise ratio and improve the accuracy and reliability of the user's command input.

In an implementation, the device can be a tabletop device and can be battery powered. It can include a standby mode in which it utilizes a minimal amount of energy consumption. In an implementation, the device can have a "push-to-talk" mode of operation, where the user can touch or press a button on the device (e.g., near one or more microphones nearest to the user) to initiate speech input. The device can have one or more buttons, each button associated with one or more microphones nearby each other. For example, one button on a first side of a cubic device may be associated with a single microphone on that side, while another button on a second side of the device may be associated with two microphones disposed on the second side. Any arrangement of buttons can be used on a device of any shape. A touch of a button can be used by the device to infer the approximate direction from the device to the user. Likewise, any other gesture-type system may be used, such as a camera-based gesture detection system. For example, the device can have cameras disposed at different positions (e.g., on different sides) of the device, where each camera can detect the proximity of the user, or detect a gesture by the user to activate one or more microphones nearest the user to receive a user command.

In an implementation, the device can have a radially symmetric shape, such as a sphere or a hemisphere. In the case of the hemisphere, the hemisphere can include microphones arranged at various points on its surface. Buttons, a more general touch-detection system (using technology such as that used in touch screens and the like), cameras or other sensors can be used to infer the direction from the device to the user. For example, if buttons are arranged around the surface of the hemisphere, the position of the button touched by the user to initiate a command can be inferred to be the button closest to the user. The implementation can tailor the acoustical response of a microphone to maximize sensitivity in that direction and actively reject sounds coming from other directions, thus improving the reliability of the command interpretation system, which can include an automatic speech recognition subsystem.

Figure 2:
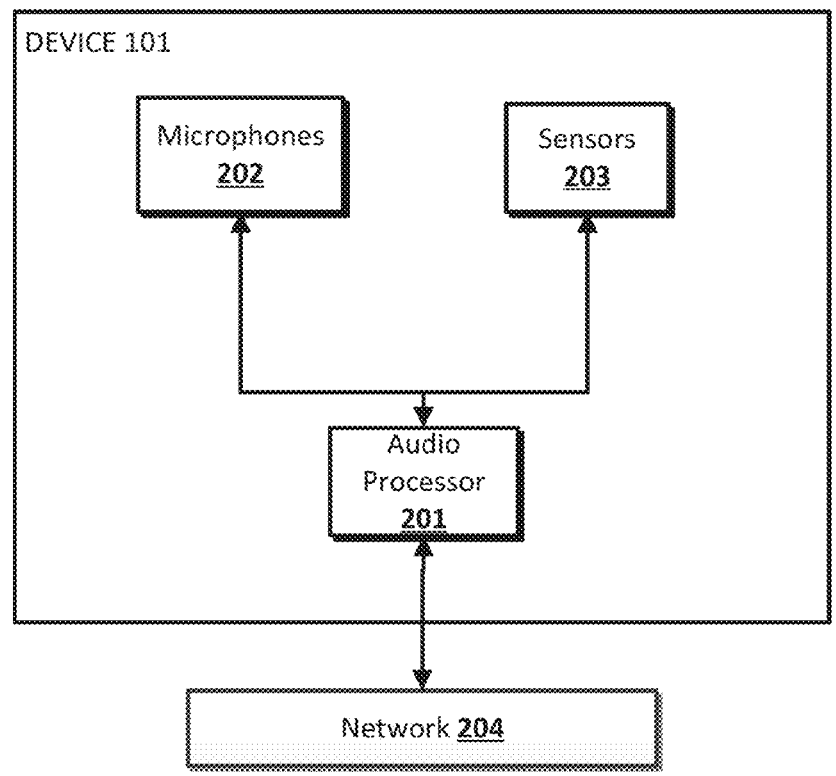
FIG. 2 shows a system according to an implementation of the disclosed subject matter.

An example of an implementation is shown in FIG. 1. A device 101 can include a sensor system and several microphones. The sensor system shown in FIG. 1 includes a set of buttons 112-117. The microphones 102-107 can be disposed at locations around the device. Referring to FIG. 2, an audio processor 201 that can be included in device 101 can be in communication with the microphones 202 (102-107 in FIG. 1) and the sensors 203 (112-117 in FIG. 1). Audio processor 201 can associate one or more sensors (such as buttons) with one or more microphones. For example, (referring to FIGS. 1 and 2), audio processor 201 can associate button 113 with microphone 103, button 115 with microphones 105, and so on. A button can be associated with a microphone based on the likelihood that a touch a button by a user indicates that the associated microphone is best disposed to receive the clearest (e.g., lowest signal-to-noise ratio) command input from the user, compared to the other microphones. The associated microphone may be more than one microphone. Likewise, more than one button may be associated with one or more microphones. The microphone that is best disposed to receive the command may be the microphone that is closest to the button, or the microphone that is acoustically in the best position to receive the command, even though it may not be the closest microphone to the button or even to the user.

Upon receiving a touch signal from a user, the acoustic processor 201 can cause sound received from the associated button to be processed as coming from the principal channel communicating a command by the user. Acoustic processor 201 can use sound coming from other microphones not associated with the touch signal to process the command input to further improve the signal-to-noise ratio. For example, sound coming from other microphones can be used to cancel ambient noise in the signal.

In another implementation, the device can have a single microphone with steerable sensitivity. Upon receiving a touch signal, acoustic processor 201 can infer the direction from the device to the user and electronically and/or mechanically steer the microphone towards the user. Likewise, acoustic processor 201 can electronically and/or mechanically steer the microphone to maximize the signal-to-noise ratio of the acoustic signal from the user, whether or not the direction is toward the user.

Figure 3:
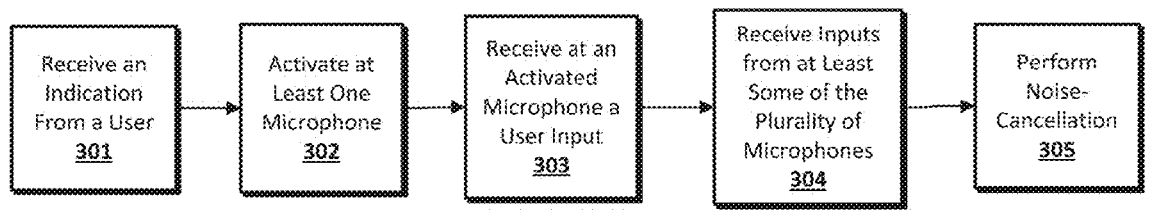
FIG. 3 shows a process according to an implementation of the disclosed subject matter.

As shown in FIG. 3, a method in accordance with an implementation can include receiving a gesture from a user 301. The gesture can be a button-push, a touch, a gesture detected by a camera and/or a depth sensor, and so one. Based on the gesture received from the user, a microphone system can be configured to be more sensitive in the direction of the user from a device 302. A microphone system can be one or more microphones. One or more of the microphones in the microphone system can be electronically and/or mechanically steerable to be more sensitive in a particular direction than in other directions. One or more of the microphones may not be steerable. One or more microphones may be associated with the gesture. For example, if the gesture is a button touch, one or more microphones near the touched button can be associated with the gesture. The microphones associated with the gesture can be made more sensitive than the other microphones that are not associated with the gesture. The input received through the microphones associated with the gesture can be processed differently than inputs received from microphones not associated with the gesture. The input received through the associated microphones can be considered to predominantly contain the signal of interest, e.g., a user command. The non-associated microphones can be considered to predominantly contain noise, such as ambient noise. The input from the non-associated microphones can be used to subtract noise in the input from the associated microphones.

A first acoustic input can be received from the direction of the user 303. The input can include a voice command, such as a command for a home automation system, a command to cause the device or another device or system to perform an action, etc. An automatic speech recognition system can recognize the command based on the first acoustic input.

A second acoustic input can also be received from a direction other than the direction of the user 304. This second acoustic input can be used to increase the signal-to-noise ratio of the first acoustic input. For example, the second acoustic input can include ambient noise. The ambient noise detected in the second acoustic input can be used to reduce the effect of ambient noise in the first acoustic input, thereby improving the signal-to-noise ratio 305. This can increase the reliability and accuracy of the extraction of a command from the first acoustic input by the automatic speech recognition system.

An implementation of a system in accordance with the disclosed subject matter is shown in FIG. 2. The implementation can include at least one sensor 203 that can receive a gesture from a user. The sensor can be a touch sensor, a camera, a depth sensor, etc. It can include a microphone system 202 and an audio processor 201 in communication with the sensor 203 and the microphone system 202. The microphone system can include at least one microphone, which may be electronically and mechanically steerable. The audio processor 201 can configure the microphone system 202 based on the gesture received from the user at the sensor 202. The microphone system 203 can be configured by the audio processor 201 to be more sensitive in the direction of the user from a device. The audio processor 201 can receive a first acoustic input from the direction of the user.

The audio processor 201 can perform automatic speech recognition based on the first acoustic input. The audio processor 201 can receive a second acoustic input from a direction other than the direction of the user. It can perform automatic speech recognition based on the first acoustic input and the second acoustic input.

An acoustic input and/or command may be sent to through a network to an external system or device, such as a home automation system.

While various implementations of the present disclosure have been described above, it should be understood that they have been presented by way of example and not limitation. It will be apparent to one skilled in the pertinent art that various changes in form and detail can be made therein without departing from the spirit and scope of the present disclosure.

Figure 4:
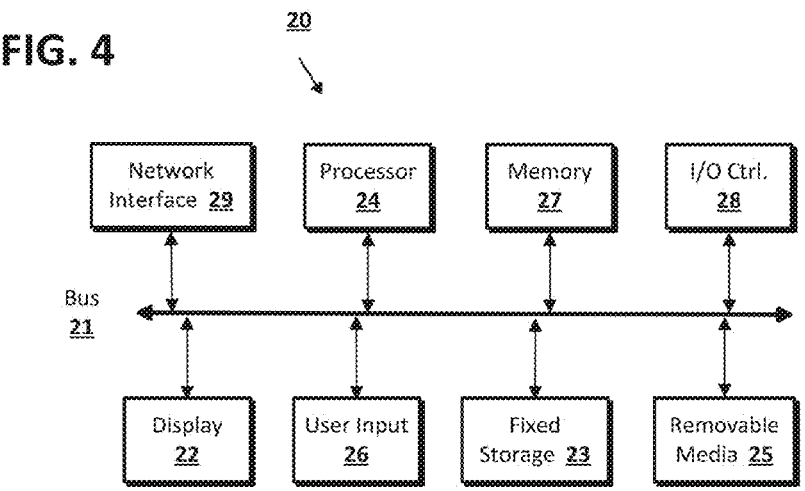
FIG. 4 shows a computer system according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 can include a bus 21 which interconnects major components of the computer 20, such as a processor 24, which can be an audio processor, a memory 27 (typically RAM, but which may also include ROM, flash RAM, or the like), an input/output controller 28, a user display 22, such as a display screen via a display adapter, a user input interface 26, which may include one or more controllers and associated user input devices such as a sensor such as a button, a touch sensitive device, a camera, a depth sensor and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner. Conversely, all of the components shown in FIG. 4 need not be present to practice the present disclosure. The components can be interconnected in different ways from that shown. The operation of a computer system such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
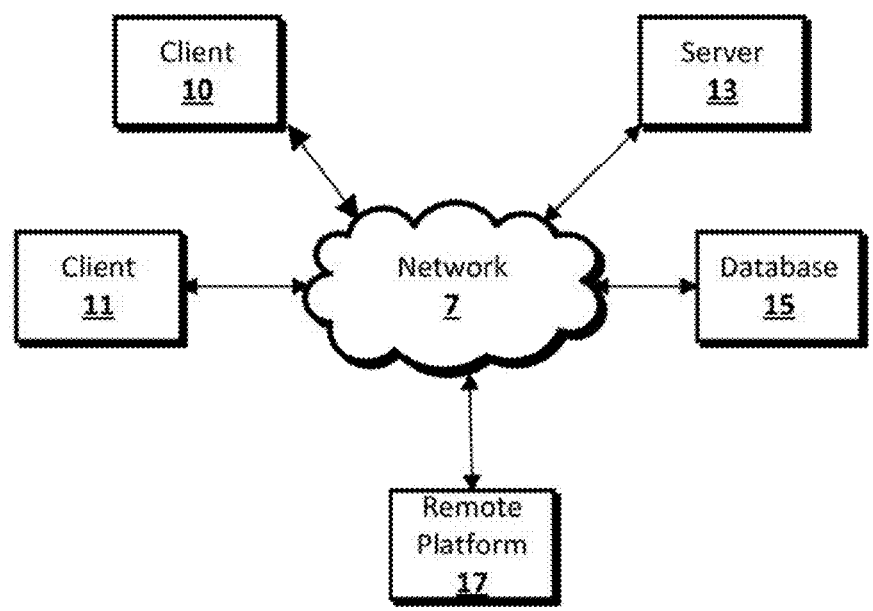
FIG. 5 shows a network configuration according to an embodiment of the disclosed subject matter.

FIG. 5 shows an example network arrangement according to an embodiment of the disclosed subject matter. One or more client devices 10, 11, such as home automation appliances, local computers, smart phones, tablet computing devices, and the like may connect to other devices via one or more networks 7. The network may be a local network, wide-area network, a home automation network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   receiving a gesture from a user, wherein the gesture is a touch input;
   configuring a microphone system based on the gesture received from the user to be more sensitive in the direction of the user that the gesture was received from based only on the direction from which the gesture was received; and
   receiving a first acoustic input from the direction of the user.

2. The method of claim 1, further comprising receiving a second acoustic input from a direction other than the direction of the user.

3. The method of claim 2, further comprising increasing the signal-to-noise ratio of the first acoustic input based on the first acoustic input and the second acoustic input.

4. The method of claim 1, further comprising:
   performing automatic speech recognition based on the first acoustic input; and identifying a user command based on the performing automatic speech recognition based on the first acoustic input.

5. The method of claim 2, further comprising:
performing automatic speech recognition based on the first acoustic input and the second acoustic input; and
identifying a user command based on the performing automatic speech recognition based on the first acoustic input and the second acoustic input.

6. The method of claim 1, wherein the configuring a microphone system based on the gesture from the user includes increasing the sensitivity of at least one microphone by using at least one selected from the group of: electronic steering and mechanical steering.

7. The method of claim 1, further comprising associating at least one of a plurality of microphones with the gesture.

8. The method of claim 7, wherein the first acoustic input is received from the at least one of a plurality of microphones associated with the gesture.

9. A system, comprising:
at least one sensor adapted and configured to receive a gesture from a user, wherein the sensor is a touch sensor or a button;
a microphone system; and
an audio processor in communication with the sensor and the microphone system to configure a microphone system based on the gesture received from the user at the sensor, the microphone system configured by the audio processor to be more sensitive in the direction of the user that the gesture was received from based only on the direction from which the gesture was received and to receive a first acoustic input from the direction of the user.

10. The system of claim 9, wherein the sensor includes at least one selected from the group consisting of: a camera and a depth sensor.

11. The system of claim 9, wherein the microphone system includes at least one electronically steerable microphone.

12. The system of claim 9, wherein the microphone system includes at least one mechanically steerable microphone.

13. The system of claim 9, wherein the audio processor is adapted and configured to perform automatic speech recognition based on the first acoustic input.

14. The system of claim 9, wherein the audio processor is adapted and configured to receive a second acoustic input from a direction other than the direction of the user and to perform automatic speech recognition based on the first acoustic input and the second acoustic input.

15. A system comprising: one or more computers and one or more storage devices storing instructions which are operable, when executed by the one or more computers, to cause the one or more computers to perform operations comprising:
receiving a gesture from a user, wherein the gesture is a touch input;
configuring a microphone system based on the gesture received from the user to be more sensitive in the direction of the user that the gesture was received from based only on the direction from which the gesture was received; and
receiving a first acoustic input from the direction of the user.

16. The system of claim 15 wherein the instructions further cause the one or more computers to perform operations comprising receiving a second acoustic input from a direction other than the direction of the user.

17. The system of claim 16 wherein the instructions further cause the one or more computers to perform operations comprising increasing the signal-to-noise ratio of the first acoustic input based on the first acoustic input and the second acoustic input.

18. The system of claim 15 wherein the instructions further cause the one or more computers to perform operations comprising:
performing automatic speech recognition based on the first acoustic input; and
identifying a user command based on the performing automatic speech recognition based on the first acoustic input.

19. The system of claim 16 wherein the instructions further cause the one or more computers to perform operations comprising:
performing automatic speech recognition based on the first acoustic input and the second acoustic input; and
identifying a user command based on the performing automatic speech recognition based on the first acoustic input and the second acoustic input.

20. The method of claim 15, wherein the instructions further cause the one or more computers to perform operations comprising:
increasing the sensitivity of at least one microphone by using at least one selected from the group of: electronic steering and mechanical steering when configuring a microphone system based on the gesture from the user.

* * * * *